_United States Patent Office_ 2,778,740
Patented Jan. 22, 1957

2,778,740
EMULSION PAINT

Ralph Sterling Armstrong, East Chicago, Ind., assignor to The Sherwin-Williams Company, Cleveland, Ohio, a corporation of Ohio No Drawing. Application December 14, 1953,
Serial No. 398,228

18 Claims. (Cl. 106—170)

This invention relates to a nonionic emulsion paint suitable for direct application to wall areas without further reduction with water and which has the capacity to tolerate inorganic ionic material.

Heretofore, emulsion coating compositions applicable by brush to surface areas have been opacified with pigments selected for their freedom from ionizable metallic salts which salts contribute materially to the ion content of the emulsion system.

In the main, the commercially successful emulsion coatings containing an oleoresinous varnish as the disperse phase have relied upon the addition of long chain fatty acid soaps, rosin soaps, or anionic surface active agents of the alkyl aryl sulfonate class, or the formation of soaps due to residual acidity in the oleoresinous varnish for emulsification. The aforementioned monomeric anionically classified surface active agents are used alone and in combination with monionic agents, but in such cases emulsion stability of the paint system is seriously impaired when the pigmentary phase, or the surface active agent carries with it ionizable metal salts.

Further, while not uniquely so, the protective colloid useful in a system based upon anionically active agents is most generally an aqueous dispersion of a protein, said dispersion achieved by employing therewith organic and inorganic bases. The alkaline material necessary for the dispersion of the protein also contributes objectionable ions to the prior art oil-in-water emulsion paint systems. Further, emulsion paint systems based upon salts of alkyl aryl sulfonates, soaps, etc., as the surface active agents and stabilized with protein dispersions are characterized by pH's of 8 to 11 and preferably from about 8.5 to 9.0. A pH or hydrogen ion concentration in this range is essential to emulsion stability of such systems.

Perhaps the most serious limitation of prior-art emulsion coating compositions is their lack of tolerance of ionizable metal salts which are present in many pigments either as an impurity from their manufacture or by deliberate inclusion as a component of the pigmentary material of the disperse pigment phase. Most notable of these are pigments containing calcium sulfate, and particularly a composite pigment used extensively in conventional (as opposed to emulsion) coating compositions containing approximately 30 percent of titanium dioxide and 70 percent of calcium sulfate, often referred to as titanium-calcium pigments. When one attempts to formulate an emulsion coating using titanium-calcium pigments or pigments carrying any appreciable amount, as little as 1–2 percent, of ionizable salt, the results heretofore have been to produce a product incapable of application by brush to sizeable wall areas, as in painting a room. While small test panels may be occasionally coated with such products, upon attempting to coat areas of practical dimension (e. g., a series of 4' x 4' panels) the emulsion system breaks down and the emulsion paint "gums" in the brush, resulting in fine to coarse particles appearing over the freshly coated wall area. Color uniformity and opacity of the film are lost due to emulsion breakdown, and the area coated presents a most unsatisfactory aspect, a source of consumer complaint.

It is, therefore, an object of this invention to produce an emulsion-type coating composition capable of tolerating appreciable quantities of ionizable metal salts.

It is a further object to produce an emulsion paint capable of being applied to areas of practical dimension by means of brushing without emulsion breakdown, of essentially neutral pH or hydrogen ion concentration.

It is a specific object to provide a pigmented emulsion in a condition ready for use, yet capable of being subject to repeated freezing and thawing cycles without emulsion breakdown.

Another specific object is to provide a pigmented emulsion for coating purposes containing only nonionic surface active agents of a particular category as the emulsifying agent and water soluble cellulosic material as the protective colloidal agent.

A further specific object is to provide a protein-free emulsion coating characterized by its constant viscosity and freedom from odors of partial decomposition of proteins.

This application is a continuation-in-part of my co-pending application U. S. Serial No. 249,417 filed October 2, 1951, now abandoned.

The coating compositions of this invention consist of a disperse oil phase, a continuous aqueous phase and a solid pigmentary phase, the oil phase thereof comprising an oleoresinous varnish substantially free of volatile organic solvents and non-neutralized or non-esterfied acidity, the aqueous or continuous phase free from water souble monomeric organic salts and soaps having surface activity (e. g., effect upon surface tension) and containing as the two essential components thereof, at least one monionic surface active agent and a water soluble cellulose derivative selected from the group consisting of methyl cellulose, ethyl cellulose, hydroxyethyl cellulose and the ammonium and alkali metal salts of carboxy methyl cellulose and cellulose sulfate as the protective colloid. The aqueous phase constitutes in excess of 60 percent by volume of the total composition and the emulsion coating composition of this invention is characterized by a substantially neutral pH, low electrical conductivity prior to the incorporation of pigments containing ionizable metal salts, and with or without inclusion of ionizable calcium salts in the pigmentary phase, excellent emulsion stability.

THE DISPERSE OIL PHASE

Considerable latitude exists in the selection of the oleoresinous varnish suitable as the oil phase of the disclosed coating compositions. The nature of the oil phase is not critical and almost all varnish vehicles can be employed for the purposes of this invention provided the acid value of the vehicle is not so high as to form objectionable quantities of soap in the presence of alkaline materials. Acid values below 20 are preferred for this reason.

The term "oleoresinous varnish" is used herein as defined by Mattiello (vol. I, page 29) "Protective and Decorative Coatings," e. g., "a solution or dispersion of a synthetic or natural resin in an (drying) oil vehicle. A chemical combination may or may not take place between the resin and oil in the cooking process." Later in vol. 3 of the same reference work, page 194, varnish is described as "a liquid coating material containing no pigment which flows out to a smooth coat when applied and dries to a smooth, glossy, relatively hard, permanent solid when exposed in a thin film to air." On page 195 of the same article an "oleoresinous varnish" is defined to include:

(1) Oil plus:
    (a) Natural resin
    (b) Synthetic resin
(2) Oil
(3) Oil modified glycero phthalate The proportions of resin to oil are somewhat limited by viscosity considerations for the smaller the amount of the oil, or the shorter the oil length (usually stated in terms of the number of gallons of said oil to 100 pounds of resin) the greater the viscosity of the resultant varnish solids. As the viscosity of the varnish solids is increased, the difficulties of handling and dispersion from a mechanical view become more complex. Difficulty can be alleviated partially by heating, but at temperatures much above the boiling point of water additional difficulties arise. For this reason, as well as considerations relative to the nature of the resultant film, it is preferred to use a 30 to 40 gallon length varnish. In the case of alkyd-type oleoresinous varnishes, the percentage of dibasic acid, usually phthalic but not essentially so, cannot be conveniently employed in excess of 25 percent based on the total weight of the alkyd vehicle solids.

Varnish vehicles useful in my compositions are substantially free of volatile organic solvents therefore. By "substantially free" is meant not greater than 10 percent and preferably from 5 percent or less of solvent may be included. The preferred solvents in the limited range are the volatile terpenes, such as d-limonene and the orange terpenes having pleasant odor characteristics. Pine oil may be employed. Greater amounts of solvent are not desired as ordinary varnish solvents introduce obnoxious odor and reduce the vehicle solids content or the film-forming solids of the emulsion system. Drying oils suitable as the oil constituent may be conjugated oils or non-conjugated oils having an iodine value in excess of 120, soya bean oil being included within the lower limitation of iodine value. By the term "non-esterified" or "non-neutralized" acidity as a limitation upon the oleoresinous vehicle as used herein, it is intended that the varnish have an acid value of not in excess of 20 and preferably less. Above this figure, water soluble soaps and salts are formed which interfere as do the ionizable inorganic metal salts with the quality of the resultant emulsion coating.

Driers may be and usually are included in the oleoresinous varnish to accelerate drying, as is well known in the paint art.

THE AQUEOUS PHASE

The aqueous phase of the emulsion coating composition described and claimed herein contains two essential components. These are a nonionic surface active agent or agents and a protective colloid. Attention is hereinafter directed to negative limitations and then to essential components of the phase.

While a number of nonionic emulsifying agents can be employed and are within the scope of the general disclosure, paints made without careful selection among the broad class of nonionic surface active agents may be lacking in one or more of the qualities of brushability, flow, recoatability and washability obtained in the preferred embodiment of my invention as hereinafter more specifically disclosed.

As is well known in the art pertaining to surface active agents, there are three principal classifications, the names of which are derived from their functional behavior. These classifications are anionic, nonionic and cationic by name. The anionic group constitutes the largest class and includes those of greatest variety in chemical structure.

Among the anionic class are the alkaline soaps or salts of acidic organic compounds containing at least 8 carbon atoms in the lipophilic or "oil loving" portion of the molecule. Also included are most of the compounds referred to broadly today as synthetic detergents which are characterized by solubility of their hard water salts or soaps. This classification of surface active agents has been employed almost exclusively until recently in emulsion paint technology because of its availability, moderate price and effective performance.

Their presence in the composition here of interest cannot be tolerated, however, in appreciable amounts. Virtual absence of monomeric organic soaps or salts (anionic surface active agents) heretofore employed in emulsion paint systems either by design or accident is the key to the success of the combination herein described.

In setting forth the best method of practice of the invention, the negative limitation is inherent. Yet the knowledge of the difficulty due to the presence of ionic organic materials may be of material value to those who wish to practice the invention.

The cationic class of surface active agents is also of negative value and serves no useful purpose and is presumed to be detrimental in the herein described composition.

Having described the classes of surface active agents to be avoided, the essential nonionic surface active agents will be considered.

The nonionic surface active agents essential to the ends of the invention include compounds variously labeled as polyalcohol esters, polyglycol esters, polymerized higher glycol esters, polyhydric alcohol esters, polyalkyl ether esters, polyoxyalkylene esters, polyoxyethylene esters, polyethylene glycol esters, alkyl aryl polyoxyethylene ethanols, alkyl polyoxyethylene ethanols, alkyl aryl polyoxypropylene ethanols, etc.

The polyhydric alcohol esters, by way of illustration, may be monoglycerides of a long chain fatty acid, e. g. stearic, etc., condensed with ethylene oxide, propylene oxide or mixtures thereof.

Other than a polyhydric alcohol, the water soluble portion or group of the molecule contains a plurality of ether linkages as obtained by condensing therewith a plurality of alkylene oxide units. Ethylene oxide is the most often used but propylene oxide is not excluded and may be substituted therefor in whole or in part in some instances.

Alkylene oxide condensates with polyhydric alcohols, etc., give rise to ether alcohols, the nature of which depends in part upon the nature of the organic compound with which the alkylene oxide is condensed. Both the ether linkage and the hydroxyl group contribute to the hydrophilic portion of the surface active molecule.

Alkylene oxides may also be condensed with water insoluble amines, phenols, etc. to increase the water sensitivity of the parent compound to create nonionic agents useful for the purposes of this invention.

In the general art of surface active agents it has been fairly well established that the oilophilic portion of the surface active agent molecule will contain a minimum of eight carbon atoms. Often times a larger number of carbon atoms may be utilized, particularly where the oilophilic group is of the alkyl aryl classification or where the oilophilic group is derived from vegetable seed oils, petroleum derivatives, etc.

From the above it can be seen that small molecules having oil soluble and water soluble groups do not necessarily qualify as surface active agents, as the term is generally employed in the emulsion art. Ethylene glycol monoethyl ether, for example, is both oil soluble and water soluble but does not qualify for the purposes of this invention. First, it is of too low a molecular weight. Second, the oilophilic portion of the molecule is of insufficient size to be effective as a detergent material.

Trade names of nonionic surface active agents useful for the purposes of this invention include but are not limited to the following:

Igepal CA
Igepal #300
Igepal CO
Antarox A-400

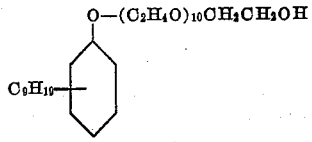

Triton X-100
Emulphor DDT

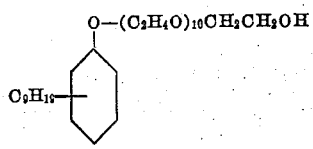

Tween 20—sorbitan monolaurate polyoxyethylene condensate
Tween 40—sorbitan monopalmitate polyoxyethylene condensate
Tween 60—sorbitan monostearate polyoxyethylene condensate
Tween 80—sorbitan monooleate polyoxyethylene condensate
Antara 424—one third methyl alcohol—two thirds of the condensation product of nonyl phenol with about 10 mols of ethylene oxide (Triton X-100)
Ethomeen C/20

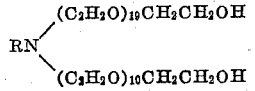

where R is a coconut fatty acid group, etc.

The above trade named compounds include octyl and nonyl phenoxy polyoxyethylene ethanols wherein the ethanoxy groups number from 7 to 20, alkyl polyoxyalkylene ethanols wherein the alkyl group is a $C_8$ and above hydrocarbon and the polyoxyalkylene portion of the molecule is selected from the group consisting of ethylene and propylene oxide adducts. Others are produced from monoesters of polyhydric alcohols further condensed with ethylene oxide and/or propylene oxide wherein the esterifying acid may be palmitic acid, stearic acid, oleic acid, etc. having at least 8 carbon atoms (preferably higher for the purposes of this invention), and long chain fatty (acid) amines condensed with a plurality of ethylene oxide or propylene oxide units.

In general, description of methods for producing nonionic surface active agents of particular interest are described more fully in U. S. Patent 1,970,578 of August 21, 1934, now a part of the public domain.

The nonionic surface active detergents useful for the purposes of this invention include the water insoluble esters, ethers, amines and amides of a nonomeric organic compound containing a hydrophobic group of at least eight carbon atoms (and preferably larger, e. g. 12-20 carbon atoms) condensed with a sufficient number of alkylene oxide groups to form a hydrophilic polyether portion of the molecule, the resultant water soluble nonionic agent having a molecular weight of not less than 550. The preferred alkylene oxide is ethylene oxide, however as previously indicated, propylene oxide is known to be more or less useful substituent therefor.

Of further importance in the nonionic surface active agent is the balance between the hydrophobic portion and the hydrophilic portion of the molecule. So far as is known there is no art recognized method of reducing this factor to a mathematical concept. There appears to be some relationship in this balance to the solubility of the agent in water and in oil but solubility alone is merely indicative. If all surface active agents were to be classified into five groups in order of increasing hydrophilic quality of the first would be of over-balanced oilophilic characteristic sufficiently to be water insoluble and to form only water-in-oil type emulsions, the second class would be useful primarily for wetting-out purposes, the third class as useful in producing oil-in-water emulsions, the fourth as detergents and the fifth as solubilizing agents. Nonionics having the proper hydrophilic-hydrophobic balance for the present purposes would be classed under the fourth group, or as detergents as to this balance factor. Broadly, they may therefore be classed as nonionic detergents. Addition of as little as 0.5% of the useful nonionic agents of value here will reduce the surface tension of distilled water from about 72 dynes to about 40 dynes.

Roughly, comparison of the molecular weight of the hydrophilic groups of the useful detergent class of nonionics to the molecular weight of the hydrophobic and oilophilic (oil soluble) groups indicates the useful ratio to be within the range of 1.5 to 1 to not appreciably above 3 to 1.

An ancillary surface active agent has been found useful to enhance the working properties, particularly the brushability of the emulsion paints described herein. This ancillary agent is defined herein as the condensation product of a long chain fatty acid (e. g. 8-24 carbon atoms) with at least two mols of an alkylolamine at a temperature of from 100 to 300° C. Ninol 2012-A (a product of Ninol Laboratories, Chicago, Illinois, described in U. S. Patent 2,089,212 issued August 10, 1937. See also Reissue Patent No. 21,530) is illustrative of a useful ancillary nonionic agent. Doubtless other supplementary nonionic agents may be used for ancillary purposes in conjunction with the particular nonionics described as essential to the ends of this invention.

The second essential component of the aqueous phase is the protective colloid which, as the name implies, augments the stability of the emulsion system so that it can be stored under a variety of temperature conditions and be applied over a variety of surfaces by one or more methods of application, e. g., brushing, spraying, rollercoater, etc., without disruption of the emulsion phase relationships. Heretofore, aqueous alkaline dispersions of proteins have been most commonly used for this purpose, and heavy concentrations of long chain fatty acid and rosin acid soaps have also served this purpose, but, as previously stated, anionic agents are not useful nor operative for the purposes of this invention.

Suitable protective colloids for purposes of this invention include water soluble cellulose derivatives selected from the group consisting of methyl cellulose, ethyl cellulose, hydroxyethyl cellulose, and ammonium and alkali metal salts of carboxymethyl cellulose and cellulose sulfate. These water soluble cellulose derivatives are not equally useful, although all may be used with a modicum of success. The alkali metal salts of carboxymethyl cellulose are preferred, however, as the combined effect of this class with the other preferred ingredients of the aqueous phase produces a totality of qualities of optimum value among emulsion coating compositions of the class herein described for use in home decoration.

Water soluble methyl cellulose is the water soluble methoxy cellulose compounds having between 1.2 to 1.9 methoxy groups per anhydroglucose unit depending in some measure, of course, upon the degradation of the cellulose prior to etherification.

Water soluble ethyl cellulose as used herein, is a water soluble ethyl cellulose containing in excess of 0.8 ethoxy groups to about 1.3 ethoxy groups per anhydroglucose unit—again depending upon the degradation of the cellulose.

Water soluble hydroxyethyl cellulose as used herein is a water soluble hydroxyethyl cellulose containing an average of about 2.5 mols of hydroxyethyl groups per anhydroglucose residue unit $(C_6H_{10}O_5)z$. The value of $z$ is not known with exactitude but is believed to be not less than 1000 nor more than about 2000 anhydroglucose units.

Water soluble carboxymethyl cellulose is the reaction product of an alkali cellulose with monochloro-acetic acid containing from about 0.3 to about 0.8 carboxymethyl groups per anhydroglucose unit in the polymeric cellulose molecule. The water soluble salts of carboxymethyl cellulose are formed by reaction of the carboxy group with the fixed and the volatile alkalis to form the sodium, potassium, ammonium and related amine salts. The medium viscosity is the most useful of the commercially available carboxymethyl cellulose salts. The water soluble cellulose derivatives described and defined above are noted for their physical capacity to form gels in water at low solids concentrations.

By the term "cellulose sulfate" is meant a compound wherein approximately one sulfate group is attached per three anhydroglucose units of a cellulose chain by ester-type linkages, and again the sodium salt is preferred although the other water soluble alkaline salts, as above indicated, are potential substitutes. The quantities of these materials useful is never sufficient to reduce the aqueous phase to a paste or non-fluid condition.

THE PIGMENTARY PHASE

The distinct advance in the art of emulsion coating composition in relation to the disclosed combination resides in the capacity of the system to tolerate pigments containing from residual to very considerable quantities of ionizable inorganic salts. The immediate practical advantage is the ability to formulate emulsion coating compositions with titanium-calcium pigments which contain approximately 70 percent of calcium sulfate by weight without breakdown of the emulsion paint, particularly upon application by brush which is one of the most severe of tests, particularly upon areas of commercially significant size.

Another practical advance lies in the ability to use commercially available prime (or pigments promoting opacity in a paint system) and inert (or pigments of little hiding quality or opacity in the system) pigments containing residual quantities of ionizable metal salts, notably alkali and alkaline earth metal sulfates.

Prime pigments useful in the disclosed composition include titanium dioxide, titanium dioxide-barium sulfate, titanium dioxide-calcium sulfate, zinc sulfide, lithopone (zinc sulfide-barium sulfate) and combinations thereof. Advantage resides particularly in the ability of the emulsion system to tolerate calcium sulfate.

Inert pigments useful include calcium carbonate, mica, talc, diatomaceous silica, colloidal silica, silica, pyrophyllite, etc. A rather wide selection among inerts is possible, particularly in my composition, for the reasons given above. Inerts are not essential but are generally included in paints having other than a glossy finish or surface. Surface treated titanium dioxide pigments may be employed to produce glossy emulsion enamels in those cases where the pigmentary phase is dispersed in the oleoresinous varnish phase in the final paint film, but in flat to high sheen coatings, the pigment will be generally dispersed in the aqueous phase.

The following examples will make clear the practice of manufacture of the above-described composition and the preferred embodiment thereof.

*Example I*

2250 pounds of varnish maker's linseed oil (alkali refined linseed oil) were heated to 300 degrees F. and 750 pounds of pentaerythritol ester of a maleic rosin adduct resin were added to the hot oil. Temperature was increased to between 550 to 600 degrees F. and held for a body of from 6 to 8 minutes in a Gardner tube. The resulting varnish had a cure of 51 seconds, color of 10 and an acid value of from 10 to 20 at 100 percent solids. Optionally, 5 percent by weight of d-limonene or pine oil may be added to the above varnish solids.

*Example II.—Matte quality emulsion paint*

| Lbs. per 100 Gals. | Material | Percent by Volume |
|---|---|---|
| 115 | Titantium-calcium pigment (30% TiO$_2$-70% CaSO$_4$) | 4.0 |
| 205 | Titanium dioxide pigment | 6.0 |
| 40 | Lorite (Inert pigment) (Diatomaceous earth—CaCO$_3$) | 1.5 |
| 8 | Sodium cellulose glycollate (Medium viscosity—400-600 cps. viscosity grade) | |
| 18 | Nonyl phenoxy polyoxyethylene ethanol of molecular weight above 550 (Antarox A-400) | |
| 4 | Mono-stearic acid condensate of diethanolamine (Ninol 2012-A) | |
| 95 | Varnish of Example I | 11.9 |
| 3 | Cobalt naphthenate drier (6% metal) | |
| 5 | Lead naphthenate drier (24% metal) | |
| 10 | Emulsified sulfonated tallow (Anti-foam agent) | |
| 570 | Water | |

The pigmentary materials, sodium cellulose glycolate, and the nonionic emulsifying agents are weighed into a pony mixer pan and 165 pounds of water are added thereto. The resulting stiff paste is allowed to mix for 15 to 20 minutes after which the anti-foam agent is blended in. The cobalt and lead driers are mixed with the varnish and the prepared varnish vehicle is added slowly to the paste, which is again mixed for another 15 to 20 minutes. An additional 165 pounds of water are added to the resultant mixture and the entire contents of the pony mill pan are passed through a colloid mill, set so that the clearance between the rotor and stator is approximately 0.005 to 0.007 of an inch. Thereafter the remaining water is added to the milled paste or sufficient of it as is necessary to bring the viscosity of the resultant product to a predetermined good brushing level, e. g., 9 to 11 seconds on Sherwin-Williams viscosity cup.

The above product may be subjected to deep freezing for 24 hours down to a temperature of minus 20 degrees F. and allowed to come back to room temperature in another 24 hours and this cycle repeated for 4 or more times without deterioration of the emulsion system.

The resulting paint has excellent brushing characteristics and an exceptional "wet edge." After drying for 24 hours, the paint film may be washed without removal of the film.

*Example III*

This example was made similarly to Example II, with the exception that 200 pounds of titanium dioxide constituted the entire pigment employed. In other words, no titanium-calcium pigment nor inert pigment was used. In this case, the pigmentary phase constitutes about 6 percent of the total volume. The resulting product is possessed of a relatively high sheen. Below this pigment content, the opacity of the resultant film is deficient for practical purposes.

*Example IV*

Same as Example II, except 390 pounds of titanium-calcium pigment, 90 pounds of titanium dioxide pigment and no inert or extender pigments as such were employed.

The resulting emulsion paint product produced a film which was relatively weak due to the high pigmentary content (approximately 17 percent by volume of the total paint product). When the pigment volume of the paint is increased to this level and above, washability falls off and the paint film has a tendency to be removed upon rubbing. While pigmentation of this level is possible, it is above a practical range.

Example V

Same as Example II, except that 6 pounds of medium viscosity sodium carboxymethyl cellulose were used in lieu of the 8 pounds in Example II. The resulting product was thin in body and the tendency to splatter and be difficult to apply to wall areas objectionable. While the emulsion stability was sufficient to allow application, indications were that the paint was approaching the point of diminished stability and diminished practicability.

Example VI

Same as Example II, except that 10 pounds of a medium viscosity sodium carboxymethyl cellulose or sodium cellulose glycolate were used in place of the previous 8 pounds.

The viscosity of the resultant product was too heavy for easy brushability and resistance of the dried paint film to removal by washing was noticeably decreased. Using this particular protective colloid, a practical maximum useful quantity was found at this level.

Example VII

Same as Example II, except that the emulsifying agent was of the general formula $$RO(C_2H_4O)_n \cdot C_2H_4OH$$

where R is an oil-soluble group containing at least 8 carbon atoms and $n$ is a whole number from 6 to 50. The amount of nonionic detergent agent (prepared in accordance with Example 2 of U. S. Patent No. 1,970,578 using oleic acid) used was 15 percent by weight of the oil phase.

The resulting emulsion paint was less stable as to the emulsion than the paint of Example II. Application by brush was more difficult. Other tests of similar products in a series using 15 percent by weight of the oil indicated that this approached a bare minimum of nonionic emulsifying agent essential to formulate a useful product as to emulsion stability.

Example VIII

Same procedure and quantities of material were used as in Example II, except that 20 pounds of an emulsifying agent having the chemical structure

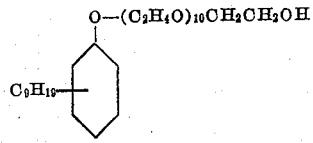

(sold under various trade names, e. g. Emulphor DDT, Igepal CA, Antarox X-400, Triton X-100, etc.) were used in conjunction with 5 pounds of a mono-stearic acid condensate of diethanolamine (see U. S. Patent No. 2,089,212).

The resulting emulsion paint had decreased viscosity as compared with that of Example II. There was a strong tendency to foaming which was not controlled by antifoaming agents, and the washability of the paint film of the product made by this example was poorer than that of the product of Example II.

This example serves to demonstrate that the proportion of nonionic agents should not exceed 30 percent of the oil phase, as the quantity of agent used increases there is introduced increasing weakness in dried films of the paint product.

Example IX

Same as Example II, except that 85 pounds of the varnish of Example I were employed to replace the 95 pounds of Example II.

The washability of the resultant film was poorer than in Example II and there was greater tendency for the paint film to show brush-marking. This test example illustrates less than about 10 percent by volume of the total paint is a minimum volume percentage of the oleoresinous binder phase. Likewise, if more than 14 percent by volume of varnish is employed, a tendency was observed toward emulsion instability and poor brushing characteristics, as evidenced by a tendency of the paint so made to drag and to exhibit excessive flow after application in a film.

Example X 205 pounds of titanium dioxide pigment surface coated with 1.5 percent by weight of aluminum resinate by passage of the pigment and coating agent through a fluid energy mill were weighed into a pony mixer pan. To the pigment was added 200 pounds of water and the paste allowed to stir for 10 minutes. To this was added slowly over a period of 10 minutes a mixture of 112 pounds of an oil-modified alkyd varnish containing about 25 percent of phthalic anhydride and 62 percent of soya bean oil having an acid value of 10 and containing 100 percent solids. Upon addition of the varnish, the pigment transferred to the oil phase. Thereafter 3 pounds of 6 percent cobalt naphthenate and 5 pounds of 24 percent lead naphthenate drier were added to the water-in-oil pigment-in-oil dispersion. After thorough agitation of the resulting paste, 20 pounds of an octyl phenoxy polyoxyethylene ethanol of molecular weight between 600 and 800 and 5 pounds of the condensation product of stearic acid (one mole) with two mols of diethanolamine of nonionic nature were added to the mixture. 10 pounds of sodium carboxymethyl cellulose were dissolved in 320 pounds of additional water along with 10 pounds of emulsified sulfonated tallow anti-foaming agent. This aqueous mixture was thereafter added slowly to the paste under agitation to produce an oil-in-water pigment-in-oil emulsion system which produced a film upon application having a higher degree of gloss than that which was obtained in Example III by dispersion of the untreated pigment in the aqueous phase.

Example XI

Same as Example II except the 8 pounds of sodium cellulose glycolate (sodium carboxymethyl cellulose) were substituted for with an equal quantity of a medium viscosity sodium cellulose sulfate, e. g., of 300–1000 cps.

The resulting paint had good brushing qualities and practically equivalent washability to the paint of Example II after 24 hours of dry.

Example XII

Same as Example II with the substitution of 10 pounds of medium viscosity water soluble methyl cellulose for the 8 pounds of sodium carboxymethyl cellulose of Example II.

The resulting emulsion paint was useful, but slightly poorer in emulsion stability and inferior in brushing characteristics as compared with the product of Example II.

Example XIII

Same as Example II with the substitution of a water soluble ethyl cellulose of medium viscosity containing between 1.1 and 1.3 ethoxy groups per anhydroglucose unit.

The resulting emulsion paint was useful but slightly inferior in quality to the product of Example II.

Example XIV

A series of nonionic surface active agents was selected from those commercially available. These were substituted for on equivalent weight basis for the first nonionic agent used in Example II, e. g., the condensation product of an 8–24 carbon atom alkyl polyethylene glycol condensation product described in U. S. 1,970,578.

The trade names of the general composition of the products substituted were as follows:

TABLE I

| Trade Name | General Chemical Structure | Remarks |
|---|---|---|
| Antarox A-400 | Alkyl aryl polyethylene glycol of the structure $(C_2H_4O)_{10}CH_2CH_2OH$ attached to a benzene ring with $C_9H_{19}$ substituent | Slight drag on brushing. |
| Napacol IL | Dimethylene glycol monolaurate | Poor lapping characteristics. |
| Igepal CO | Alkyl aryl polyethylene glycol ether $(C_2H_4O)_9CH_2CH_2OH$ attached to a benzene ring with $C_8H_{17}$ substituent | Comparable to Example II. |
| Ethofat 242/20 | Fatty acid rosin acid ethylene oxide condensate (70% rosin acids, 30% ethylene oxide). | Slight drag on brushing. |
| Ethofat 242/25 | Fatty acid rosin acid ethylene oxide condensate (Higher ethylene oxide content than 242/20). | Poor brushing characteristics. |
| Emcol H72 | Fatty acid condensation product of a polyhydric alcohol. | Poor wet edge—Emulsion stability only fair. |
| Triton X-100 | Alkyl aryl polyether alcohol $(C_2H_4O)_9CH_2CH_2OH$ attached to a benzene ring with $C_8H_{17}$ substituent | Practically equivalent to Example II. |

*Example XV*

The following range of proportions is illustrative of practical limitation of the various components useful to produce a water-reducible emulsion paint. The limitations in proportion are not sharp or critical, however.

| Ingredient | Parts by Weight | Parts by Volume, percent |
|---|---|---|
| Titanium Dioxide | } 200-500 | 5-20 |
| Titanium-calcium pigment | | |
| Inert Pigment | 0-150 | 0-5.5 |
| Water soluble cellulose (Protective colloid) | 5-10 | |
| Salt-free nonionic Detergent | 12-32 | |
| Oleoresinous varnish Solids | 85-105 | 10-15 |
| Cobalt Naphthenate (6% Metal) | 0-10 | |
| Lead Naphthenate | 1-10 | |
| Anti-foam agent (Sulfonated Tallow) | 1-20 | |
| Water | 500-650 | 60-75 |

From the foregoing illustrative examples and other examples superfluous to include here, it has been found that the useful range of components consists of from 10 to 15 percent by volume of the disperse oleoresinous phase which includes minor quantities of driers, solvents, etc. The useful range of pigmentation, based on volume, is from 5 to 20 percent of the total volume of the coating and the aqueous phase (including nonionic agents and protective colloids) accounts for the remaining 60 to 75 percent of the volume.

The amount of nonionic emulsifier essential is based upon the weight of disperse oleoresinous phase, and constitutes from 15 to 30% of the oil phase and preferably from 20 to 25 percent thereof.

More than 3 percent of the water soluble cellulose protective colloid by weight of the aqueous phase interferes with good wash fastness of the film and is excessive, but from 0.9 to 2.0 percent by weight of the said aqueous phase of sodium carboxymethyl cellulose has proven satisfactory. 1.0 to 1.5 percent by weight of sodium carboxymethyl cellulose is the preferred protective colloid, based on the weight of the aqueous phase. By the term "medium viscosity" is intended the intermediate viscosity grades as furnished by the manufacturers of the water soluble cellulose derivatives of the class described.

It is pointed out for purposes of explanation that the range of percentages as described herein is not critical in the sense that up to an exact figure the composition works very well and beyond that the system is inoperative, but rather that the range illustrated represents that range most practically useful for the purposes of the invention. Determination of useful and optimum ranges has been established by many trial batches. It has been found by experience that desired qualities of emulsion paint products are diminished rapidly as the stated useful ranges are exceeded. Illustrative of this is the increase in amount of nonionic surface active agent beyond the stated range; when this is done, the paint film becomes readily removable when washed. If the amount is less than the stated range, creaming and emulsion instability problems become a source of serious complaint.

Increasing the volume of the oil phase (varnish) in proportions outside the stated range also creates formulation unbalance with consequent strong tendency to high viscosity products, sticky brushing character and excessive flow. Decreasing the volume of the disperse oleoresinous phase to less than the stated range develops a product characterized by poor washability and ready removal in the presence of soap and water.

Having described my improved emulsion paint in such wise as to be easily duplicated by one skilled in the art, I claim:

1. An emulsion coating composition characterized by its capacity to tolerate calcium sulfate ions without emulsion break-down upon application consisting of a continuous aqueous phase, a discontinuous oil phase and a pigmentary solid phase; said aqueous phase consisting essentially of a fluid colloidal solution of water soluble cellulose derivatives characterized by their aqueous gel forming quality at low solids concentrations and at least one salt-free organic nonionic detergent of molecular weight above 550 containing a plurality of oxyalkylene units of not more than 3 carbon atoms each and a hydrophobic organic group containing at least 8 carbon atoms wherein said oil phase consists essentially of a non-volatile oleoresinous varnish vehicle of low acid value and said pigmentary phase comprises calcium sulfate containing pigment.

2. An emulsion coating composition characterized by its capacity to tolerate calcium sulfate ions without emulsion break-down upon application consisting of a continuous aqueous phase, a discontinuous oil phase and a pigmentary solid phase; said aqueous phase consisting essentially of a fluid colloidal solution of water soluble cellulose derivatives characterized by their aqueous gel forming quality at low solids concentrations and at least one salt-free organic nonionic detergent selected from the group consisting of the condensation products of a water insoluble ester, ether, amine and amide of a monomeric organic compound containing a hydrophobic and oilophilic group of at least eight carbon atoms in size with a sufficient number of oxyalkylene units containing not more than three carbon atoms each and a hydrophobic organic group containing at least 8 carbon atoms to produce a water soluble product having a molecular weight in excess of 550, and said oil phase consisting essentially of a non-volatile oleoresinous varnish vehicle of acid value less than about 20 and said pigmentary phase comprises calcium sulfate containing pigment.

3. A pigmented emulsion coating composition characterized by its capacity to tolerate calcium sulfate containing pigments in the pigmentary phase, a continuous aqueous phase consisting essentially of a fluid colloidal solution of water soluble cellulose derivatives characterized by their aqueous gel forming quality at low solids concentrations and a salt-free organic nonionic detergent having a molecular weight of at least 550 and a ratio of molecular weight of hydrophilic groups to molecular weight of hydrophobic and oilophilic groups in the said molecule of nonionic agent within the range of from 1.5 to 1 to about 3 to 1, and a disperse oil phase comprising a non-volatile oleoresinous varnish vehicle of acid value of not more than about 20 and said pigmentary phase comprises calcium sulfate containing pigment.

4. As in claim 3, wherein the water soluble cellulose is an alkali metal salt of carboxymethyl cellulose.

5. As in claim 3, wherein the salt-free nonionic detergent is an alkyl phenoxy polyoxalkylene ethanol wherein the oxyalkylene groups contain not more than three carbon atoms, and the alkyl group contains at least 2 carbon atoms, and the molecular weight of the nonionic detergent is above 600.

6. As in claim 3, wherein the nonionic detergent is a C8 to C9 alkyl phenoxy polyoxyethylene ethanol, the oxyethylene units number from 8 to 12 and the molecular weight of the said surface active agent is within the limits of 600-800.

7. As in claim 3, wherein the water soluble cellulose is sodium carboxymethyl cellulose and the nonionic detergent is a C8 to C9 alkyl phenoxy polyoxyethylene ethanol, the oxyethylene units number from 8 to 12 and the molecular weight of the said surface active agent is within the limits of 600-800.

8. As in claim 3, wherein the water soluble cellulose is sodium carboxymethyl cellulose and the nonionic detergent is an octyl phenoxy polyoxyethylene ethanol of molecular weight not less than 600 or more than about 800.

9. A pigmented emulsion composition characterized by its capacity to tolerate calcium sulfate containing pigments in the pigmentary phase without emulsion breakdown upon application of said coating consisting of from 5 to 20% by volume of pigmentary phase, from 60 to 75% by volume of a continuous aqueous phase and from 10 to 15% by volume of a dispersed oil phase, said aqueous phase consisting essentially of from 0.9 to 3.0 percent by weight thereof of water soluble cellulose derivatives characterized by their aqueous gel forming quality at low solids concentrations ether and from 10 to 30% by weight based on said oil phase of a salt-free nonionic detergent selected from the group consisting of the condensation products of a water insoluble ester, ether, amine and amide of a monomeric organic compound containing a hydrophobic and oilophilic group of at least eight carbon atoms in size condensed with a sufficient number of alkylene oxide units containing not more than three carbon atoms each to produce a water soluble product having a molecular weight in excess of 550, and said oil phase comprising a non-volatile oleoresinous varnish vehicle of acid value less than about 20 and said pigmentary phase comprises calcium sulfate containing pigment.

10. A pigmented emulsion coating composition characterized by its capacity to tolerate calcium sulfate containing pigments in the pigmentary phase without emulsion breakdown upon application of said coating consisting of from 5 to 20% by volume of pigmentary phase, from 60 to 75% by volume of a continuous aqueous phase and from 10 to 15% by volume of a dispersed oil phase, said aqueous phase consisting essentially of from 0.9 to 3.0 percent by weight thereof of water soluble cellulose derivatives characterized by their aqueous gel forming quality at low solids concentrations ether and from 10 to 30% by weight based on said oil phase of a salt-free nonionic detergent selected from the group consisting of the condensation products of a water insoluble ester, ether, amine and amide of a monomeric organic compound containing a hydrophobic and oilophilic group of at least eight carbon atoms in size condensed with a sufficient number of alkylene oxide units containing not more than three carbon atoms each to produce a water soluble product having a molecular weight in excess of 550 and a ratio of molecular weight of hydrophilic groups to molecular weight of hydrophobic groups in said nonionic agent within the range of from 1.5 to 1 to 3 to 1, and said oil phase comprising a non-volatile oleoresinous varnish vehicle of acid value less than about 20 and said pigmentary phase comprises calcium sulfate containing pigment.

11. As in claim 10, wherein the water soluble cellulose is an alkali metal salt of carboxymethyl cellulose and the quantity used is from 1.0 to 1.5% by weight of the aqueous phase.

12. As in claim 10, wherein the nonionic detergent is an alkyl phenoxy polyoxyalkylene ethanol, the alkyl group contains at least 2 carbon atoms, the oxyalkylene groups containing not more than three carbon atoms per unit and the molecular weight of the nonionic detergent is not less than 600.

13. As in claim 11, wherein the nonionic detergent is an alkyl phenoxy polyoxyalkylene ethanol, the alkyl group contains at least 2 carbon atoms, the oxyalkylene groups containing not more than three carbon atoms per unit, the molecular weight of the nonionic detergent is not less than 600 and the water soluble cellulose is an alkali metal salt of carboxymethyl cellulose.

14. As in claim 1 where the water soluble cellulose derivative is methyl cellulose.

15. As in claim 1 where the water soluble cellulose derivative is water soluble ethyl cellulose.

16. As in claim 1 where the water soluble cellulose derivative is hydroxyethyl cellulose.
17. As in claim 1 where the water soluble cellulose derivative is sodium carboxymethyl cellulose.
18. As in claim 1 where the water soluble cellulose derivative is sodium cellulose sulfate.

References Cited in the file of this patent

UNITED STATES PATENTS

| | | |
|---|---|---|
| 2,213,477 | Steindorf et al. | Sept. 3, 1940 |
| 2,321,270 | Bacon et al. | June 8, 1943 |
| 2,336,484 | Klinkenstein | Dec. 14, 1943 |
| 2,342,581 | Hoffmann | Feb. 22, 1944 |
| 2,382,533 | Auer | Aug. 14, 1945 |
| 2,550,211 | Watters | Apr. 24, 1951 |
| 2,567,722 | Marberg et al. | Sept. 11, 1951 |
| 2,624,706 | Maxcy et al. | Jan. 6, 1953 |